US012750441B2

(12) United States Patent
Riesenhuber

(10) Patent No.: US 12,750,441 B2
(45) Date of Patent: Sep. 29, 2026

(54) METHOD AND APPARATUS FOR REDUCING NETWORK TRAFFIC

(71) Applicant: Thomas Riesenhuber, Rosenau am Hengstpass (AT)

(72) Inventor: Thomas Riesenhuber, Rosenau am Hengstpass (AT)

( * ) Notice: Subject to any disclaimer, the term of this patent is extended or adjusted under 35 U.S.C. 154(b) by 405 days.

(21) Appl. No.: 18/369,237

(22) Filed: Sep. 18, 2023

(65) Prior Publication Data

US 2024/0098175 A1 Mar. 21, 2024

(30) Foreign Application Priority Data

Sep. 21, 2022 (EP) .................................... 22196774

(51) Int. Cl.
*H04M 1/72469* (2021.01)
*H04M 1/72484* (2021.01)

(52) U.S. Cl.
CPC ... *H04M 1/72469* (2021.01); *H04M 1/72484* (2021.01); *H04M 2250/22* (2013.01)

(58) Field of Classification Search
CPC ......... H04M 1/72469; H04M 1/72484; H04M 2250/22; H04M 2250/60; H04M 1/27475; H04M 1/67; H04M 1/56; G06F 3/0488; G06F 3/04817; G06F 3/0482; H04W 52/0254
See application file for complete search history.

(56) References Cited

U.S. PATENT DOCUMENTS

| | | | | |
|---|---|---|---|---|
| 9,516,161 | B1 * | 12/2016 | Marcus | G10L 21/007 |
| 10,996,917 | B2 * | 5/2021 | Graham | H04S 7/40 |
| 12,401,750 | B1 * | 8/2025 | Frisch | G06Q 20/3278 |
| 2009/0193357 | A1 * | 7/2009 | Panico | G06F 3/0481 715/803 |
| 2011/0187661 | A1 * | 8/2011 | Wakizaka | H04N 1/00411 345/173 |
| 2015/0242097 | A1 * | 8/2015 | Forstall | H04M 1/56 715/738 |
| 2015/0301683 | A1 * | 10/2015 | Yuan | G06F 3/0412 345/178 |
| 2017/0192649 | A1 * | 7/2017 | Bakken | G06F 8/38 |
| 2018/0018071 | A1 * | 1/2018 | Chabrier | G06F 3/04842 |
| 2019/0205010 | A1 * | 7/2019 | Fujii | G06F 3/03547 |
| 2021/0266392 | A1 * | 8/2021 | Hernandez | G06F 3/165 |
| 2021/0286509 | A1 * | 9/2021 | Tyler | G06F 3/0485 |

OTHER PUBLICATIONS

European Search Report dated Feb. 15, 2023 in European Application No. 22196774.8.

* cited by examiner

*Primary Examiner* — Ankur Jain
(74) *Attorney, Agent, or Firm* — Collard & Roe, P.C.

(57) ABSTRACT

A method carried out by a computer in an electronic device with a touch-sensitive display, wherein the electronic device is configured for providing a telephone connection to a second electronic device, includes the steps: provide a telephone connection to the second electronic device; display an end call icon on the touch-sensitive display while providing the telephone connection to the second electronic device, wherein in case the telephone connection is terminated by the second electronic device: within a determined time range after termination of the telephone connection, a detection of the touch-sensitive display being touched in a display area in which the end call icon was displayed during the telephone connection does not initiate a new telephone call.

14 Claims, 8 Drawing Sheets

METHOD AND APPARATUS FOR REDUCING NETWORK TRAFFIC

CROSS REFERENCE TO RELATED APPLICATIONS

Applicant claims priority under 35 U.S.C. § 119 of European Application No. 22196774.8 filed Sep. 21, 2022, the disclosure of which is herein incorporated by reference.

BACKGROUND OF THE INVENTION

1. Field of the Invention

The invention relates to a method carried out by a computer in an electronic device, as well as an electronic device comprising a processor, as well as a computer program as well as computer-readable storage medium.

2. Description of the Related Art

The document US2021286509A1, which is hereby incorporated by reference, discloses embodiments of electronic devices, user interfaces for such devices, and associated processes for using such devices. In some embodiments, the device is a portable communications device, such as a mobile telephone.

The document US10996917B2, which is hereby incorporated by reference, discloses embodiments of electronic devices, user interfaces for such devices, and associated processes for using such devices. In some embodiments, the device is a portable communications device, such as a mobile telephone.

The document US2015242097A1, which is hereby incorporated by reference, discloses a method on how to use a recent call list.

The actual mobile telephones that are described in the documents US2021286509A1, U.S. Ser. No. 10/996,917B2 and US2015242097A1 have the following disadvantage. When a user initiates a phone call to a second electronic device by using a call history of recent telephone connections, a telephone connection to the chosen second electronic device is established. During the telephone connection to the second electronic device, an end call icon is displayed on the touch-sensitive display. When the user wants to terminate the telephone connection, he has to press the end call icon. It often occurs that immediately before the user terminates the telephone connection, the telephone connection is already terminated by the second electronic device. In this case the call history of recent telephone connections is displayed again on the touch-sensitive display of the electronic device. Due to the immediate appearance of the call history of recent telephone connections after the telephone connection is terminated by the second electronic device, there often is not enough time for the user to stop the motion of his finger. In this case he unintentionally selects one of the entries of the call history of recent telephone connections and thereby initiates a telephone call to the second electronic device of the selected contact.

It was the objective technical problem of the present invention to overcome the shortcomings of the prior art.

It was the objective technical problem of the present invention to save battery resources in the electronic device when making telephone calls.

It was the objective technical problem of the present invention to reduce network overload when making telephone calls.

The solution of the objective technical problem is achieved by a method as well as an electronic device comprising a processor, as well as a computer program as well as computer-readable storage medium according to the claims.

SUMMARY OF THE INVENTION

The invention relates to a method carried out by a computer in an electronic device with a touch-sensitive display, wherein the electronic device is configured for providing a telephone connection to a second electronic device, the method comprising the steps:

- provide a telephone connection to the second electronic device;
- display an end call icon on the touch-sensitive display while providing the telephone connection to the second electronic device, wherein in case the telephone connection is terminated by the second electronic device:

- within a determined time range after termination of the telephone connection, a detection of the touch-sensitive display being touched in a display area in which the end call icon was displayed during the telephone connection, does not initiate a new telephone connection.

The advantage of the invention is that it helps to avoid the establishment of unwanted telephone connections. This improvement helps to save battery resources in the electronic device, because establishing a telephone connection is very energy intense. For battery-operated computing devices, it is important to conserve power and increase the time between battery charges. This improvement also helps to reduce network overload, because if a lot of people have such electronic devices that have a malfunction to build up unwanted telephone connections, a communication network, such as a GSM-Network, has to handle a lot of unnecessary traffic. This improvement also helps to reduce negative environmental impacts and also to reduce negative health impacts on a user of the electronic device, because in the phase when building up a telephone connection, the radiation exposure is the highest. Another aspect of the improvement is that it helps to enhance the user experience due to avoiding unwanted and annoying behavior of the electronic device. The improvement also helps to save time of the user.

In some embodiments, the electronic device has a graphical user interface (GUI), one or more processors or computers, a memory and one or more modules, programs or sets of instructions stored in the memory for performing multiple functions. In some embodiments, the user interacts with the GUI primarily through finger contacts and gestures on a touch-sensitive display. The electronic device can be in the form of a mobile telephone. In particular, the electronic device can be in the form of a smartphone.

The invention especially is of advantage when the following steps are executed before the step of providing a telephone connection to the second electronic device:

- detect a selection of a telephone call icon that is displayed on the touch-sensitive display;
- display a telephone menu associated with the selection of the telephone call icon on the touch-sensitive display;
- detect a selection of a contact or telephone number that is displayed on the touch-sensitive display;
- initiate a telephone call to the second electronic device associated with the selected contact or telephone number for the purpose of providing a telephone connection to the second electronic device. Especially in the case, when the telephone connection is based on a telephone call initiated by the electronic device, the termination of the telephone connection by the second electronic device would have high risk that the user of the electronic device unintentionally initiates a new telephone call by touching the touch-sensitive display. The sum of the process steps as mentioned above helps to improve the electronic device.

Furthermore, it may be useful to not immediately initiate a new telephone call, when the telephone menu associated with the telephone call icon displays a call history of recent telephone connections to different contacts or telephone numbers, wherein the different contacts or telephone numbers are arranged are arranged in the form of a list. Especially in the case, when the telephone connection is based on a telephone call initiated by the electronic device and a history of recent telephone connections is displayed, the termination of the telephone connection by the second electronic device would have high risk that the user of the electronic device unintentionally initiates a new telephone call by touching the touch-sensitive display. The sum of the process steps as mentioned above helps to improve the electronic device.

Furthermore, it may be provided that only a detection of the touch-sensitive display being touched the display area in which the end call icon was displayed during the telephone connection, does not initiate a new telephone call, wherein a detection of the touch-sensitive display being touched outside the display area in which the end call icon was displayed during the telephone connection, does select the operation associated with the icon that is displayed in the area where the touch-sensitive display is touched. This helps to enhance speed in handling the electronic device, which helps to reduce the time in which the touch-sensitive display has to be illuminated and thus saves battery capacity.

According to an advancement, it is possible that the determined time range after termination of the telephone connection is set to a value of 0 seconds to 5 seconds, in particular 0 seconds to 2 seconds, preferably 0 seconds to 0.7 seconds. When this time slot has passed, it is of high chance that commands entered by the user into the touch-sensitive display are not unintentional but are intentional.

Moreover, it may be provided that after termination of the telephone connection by the second electronic device, the touch-sensitive display displays the menu that was displayed before providing the telephone connection to the second electronic device, wherein at least in the display area where the end call icon was displayed, a selection of a contact or telephone number of the updated telephone menu that is displayed on the touch-sensitive display could be made impossible during the determined time range. This helps to enhance speed in handling the electronic device, which helps to reduce the time in which the touch-sensitive display has to be illuminated and thus saves battery capacity.

According to a particular embodiment, it is possible that after termination of the telephone connection by the second electronic device, the touch-sensitive display displays the telephone menu that was displayed before providing the telephone connection to the second electronic device, wherein further selection of an operation is not possible during the determined time range after termination of the telephone connection.

In an advancement it is possible that if the displayed telephone menu is a call history of recent telephone connections to different contacts or telephone numbers including the telephone connection that was just terminated and it is detected that the touch-sensitive display is touched in a display area in which the end call icon was displayed during the last telephone connection, and within the determined time range after termination of the telephone connection, instead of directly initiate a new telephone connection to one of the contacts or telephone numbers displayed in the call history, another menu appears that requests further confirmation to initiate a new telephone connection. This helps to ensure that the user can immediately start a new telephone call to a contact or a telephone number displayed in the call history if wanted.

In another embodiment it is possible that after termination of the telephone connection by the second electronic device, the end call icon is still displayed for the determined time range. This brings the advantage that the user does not accidentally initiate a new telephone call.

In another embodiment it is possible that after termination of the telephone connection by the second electronic device, a menu is displayed that does not allow direct initiation of a further telephone call.

In a further embodiment it is possible that the determined time range after termination of the telephone connection, in which a detection of the touch-sensitive display being touched in a display area in which the end call icon was displayed during the telephone connection, does not initiate a new telephone call, is not caused by a delay due to lack of computing power, but is foreseen intentionally. This brings the advantage that the time delay in the electronic device before a new telephone call can be initiated is not randomly, but that the time delay before a new telephone call can be initiated is set to a certain value. Thus, improvements of the computing power of different generations of an electronic device do not have a negative influence on the behavior of the electronic device.

In a further embodiment it is possible that, when the telephone connection is terminated by the second electronic device, the touch-sensitive display could immediately display an updated telephone menu. In this embodiment, the updated telephone menu does not display any contacts or telephone numbers within a display area where the end call icon was displayed a previous step.

Outside the end display area, a selection of a contact or telephone number of the updated telephone menu that is displayed on the touch-sensitive display, could be possible immediately when the updated telephone menu is displayed.

The updated telephone menu with all contacts or telephone numbers can be displayed after the determined time range has lapsed.

In another embodiment it is also possible that the updated telephone menu with all contacts or telephone numbers is displayed after a scroll movement is performed.

It is also possible that when the telephone connection is terminated by the second electronic device, the touch-sensitive display could immediately display a main user interface. Starting from the main user interface, the user can set new actions.

Further it is possible that when the telephone connection is terminated by the second electronic device, the touch-sensitive display could immediately display an updated telephone menu. In this embodiment, only in a display area where the end call icon was displayed in a previous step, a selection of a contact or telephone number of the updated telephone menu that is displayed on the touch-sensitive display could be made impossible during the determined time range. Outside the display area, a selection of a contact or telephone number of the updated telephone menu that is displayed on the touch-sensitive display, could be possible immediately when the updated telephone menu is displayed.

In a first variation of this embodiment, the display area where the end call icon was displayed in the previous step could have a different appearance in comparison to the rest of the updated telephone menu displayed on the touch-sensitive display. For example, the display area where the end call icon was displayed in a previous step could be grayed out. The display area where the end call icon was displayed in the previous step could also be marked by a frame or a doted frame or the like.

In a second variation of this embodiment, the display area where the end call icon was displayed in the previous step could have no different appearance in comparison to the rest of the updated telephone menu displayed on the touch-sensitive display.

A selection of a contact or telephone number of an updated telephone menu that is displayed on the touch-sensitive display, could be made possible without restriction after the determined time range has passed.

The invention further relates to a method carried out by a computer in an electronic device with a touch-sensitive display, wherein the electronic device is configured for providing a telephone connection to a second electronic device, the method comprising the steps:

- detect a selection of a telephone call icon that is displayed on the touch-sensitive display;
- display a telephone menu associated with the selection of the telephone call icon on the touch-sensitive display, wherein the telephone menu displays a call history of recent telephone connections to different contacts or telephone numbers, wherein the different contacts or telephone numbers are arranged are arranged in the form of a list;
- detect a selection of a recent telephone connection to one of the contacts or telephone numbers that are displayed in the call history on the touch-sensitive display;
- initiate a telephone call to the second electronic device associated with the selected contact or telephone number for the purpose of providing a telephone connection to the second electronic device;
- provide a telephone connection to the second electronic device;
- display an end call icon on the touch-sensitive display while providing the telephone connection to the second electronic device, wherein in case the telephone connection is terminated by the second electronic device:

- display a call history of recent telephone connections to different contacts or telephone numbers including the telephone connection that was just terminated, wherein the different contacts or telephone numbers are arranged are arranged in the form of a list wherein

- within a determined time range after termination of the telephone connection, a detection of the touch-sensitive display being touched in a display area in which the end call icon was displayed during the telephone connection, does not initiate a new telephone call.

The advantage of the invention is that it helps to avoid the establishment of unwanted telephone connections. This improvement helps to save battery resources in the electronic device, because establishing a telephone connection is very energy intense. This improvement also helps to reduce network overload, because if a lot of people have such electronic devices that have a malfunction to build up unwanted telephone connections, the communication network, such as the GSM-Network, has to handle a lot of unnecessary traffic. This improvement also helps to reduce negative environmental impacts and also to reduce negative health impacts on a user of the electronic device, because in the phase when building up a telephone connection, the radiation exposure is the highest. Another aspect of the improvement is that it helps to enhance the user experience due to avoiding unwanted and annoying behavior of the electronic device. The improvement also helps to save time of the user.

The invention further relates to an electronic device comprising a processor, characterized in that the processor is configured to perform the steps of the method as mentioned above.

The invention further relates to a computer program comprising instructions which, when the program is executed by a computer in an electronic device, cause the computer to carry out the steps of the method as mentioned above.

The invention further relates to a computer-readable storage medium comprising instructions which, when executed by a computer in an electronic device, cause the computer to carry out the steps of the method as mentioned above.

A contact or telephone number is a visual representation of telephone call information linked to a certain second electronic device, wherein the telephone call information is needed to initiate a telephone call to the second electronic device linked to the contact or telephone number via the communication network, such as the GSM-Network.

BRIEF DESCRIPTION OF THE DRAWINGS

The subject matter regarded as the invention is particularly pointed out and distinctly claimed in the concluding portion of the specification. Embodiments of the invention, both as to organization and method of operation, together with objects, features, and advantages of the invention, will become apparent from the following detailed description considered in connection with the accompanying drawings. It is to be understood, however, that the drawings are designed as an illustration only and not as a definition of the limits of the invention.

In the drawings, which each show a greatly simplified schematic illustration.

DETAILED DESCRIPTION OF PREFERRED EMBODIMENTS

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

Figure 1:
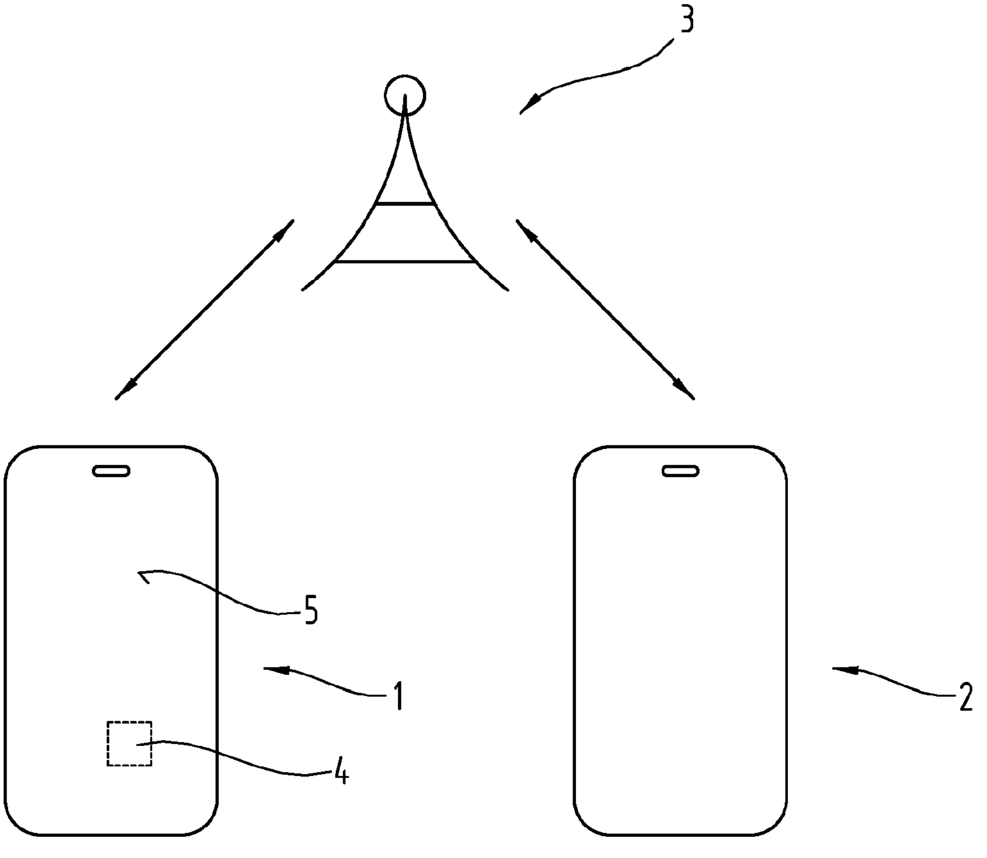
FIG. 1 shows a first embodiment of a setting of an electronic device and a second electronic device in communication.

FIG. 1 shows a first embodiment of a setting of an electronic device 1 and a second electronic device 2. In FIG. 1, the electronic device 1 and the second electronic device 2 are displayed in a schematic view.

As seen from FIG. 1, the electronic device 1 can be in the form of a mobile telephone, such as a smartphone. The second electronic device 2 can also be in the form of a mobile telephone, such as a smartphone.

For providing a telephone connection between the electronic device 1 and the second electronic device 2, both of the devices can be in connection with a communication network 3.

The communication network 3 can have multiple receiver and transmitter units. In particular, the communication network 3 can be configured for wireless communication. Such wireless communication may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (Vol P), Wi-MAX, a protocol for e-mail (e.g., Internet message access protocol (I MAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

The communication network 3 can make use of radio frequency to receive and send signals. Such signals can be electromagnetic signals.

The electronic device 1 comprises a computer 4, which can serve for managing the physical entities of the electronic device 1. The computer 4 can comprise one or more processors. The computer 4 can also comprise a memory. The memory can be storing one or more programs configured to be executed by the one or more processors. The one or more programs can include instructions for providing a telephone connection to the second electronic device 2.

The electronic device 1 also comprises a touch-sensitive display 5. Such a touch-sensitive display 5 can also be called a touch screen. The touch-sensitive display 5 serves for interaction with a user of the electronic device 1. The touch-sensitive display 5 can serve for displaying information. The touch-sensitive display 5 can also serve for entering commands into the computer 4 for performing the actions desired by the user. This can happen by the user making contact with the touch-sensitive display 5 by using one or more fingers.

Figure 2:
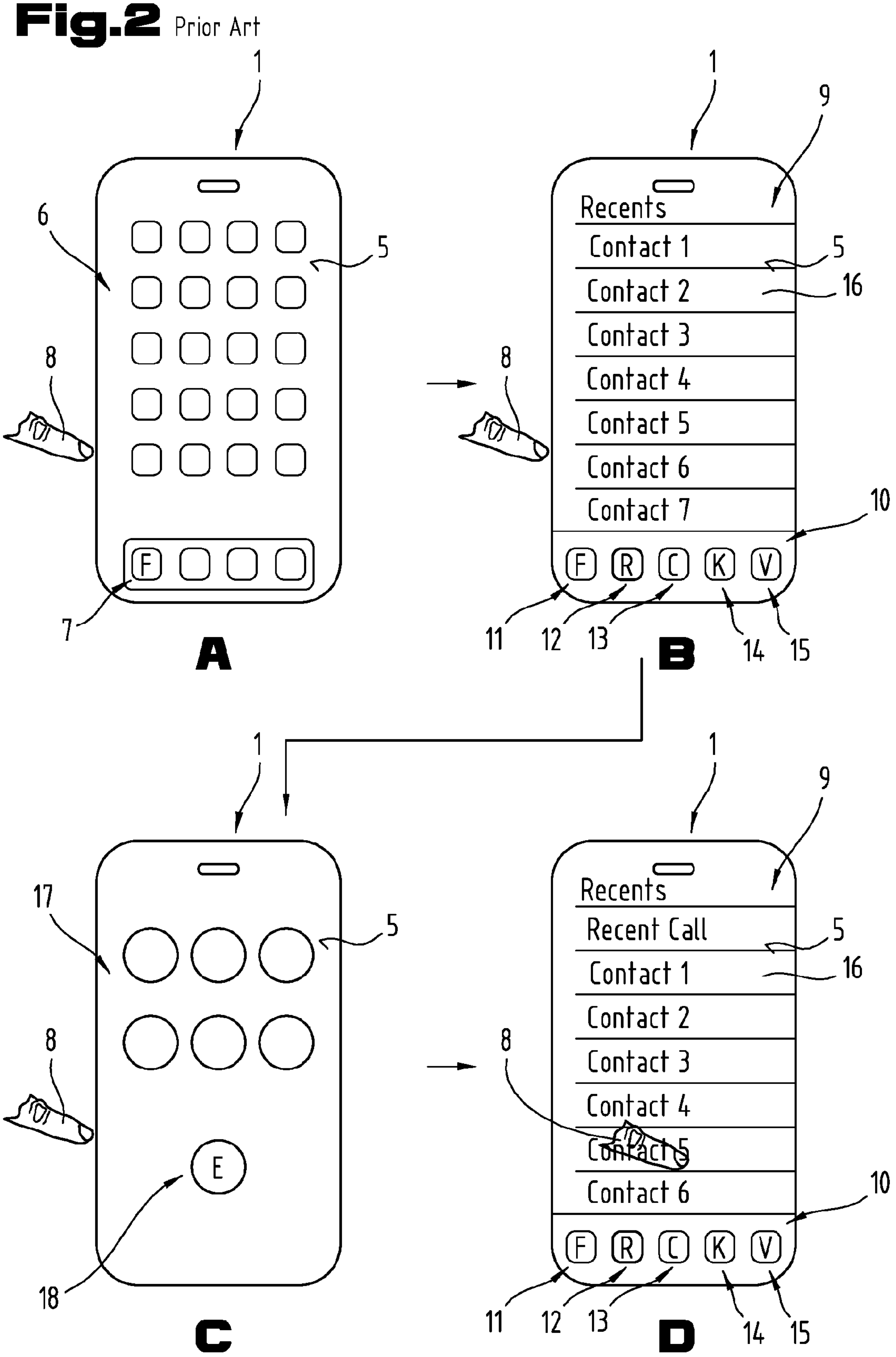
Fig.2 Prior Art
FIG. 2 shows steps that are performed when providing a telephone connection to the second electronic device as known from the prior art.

FIG. 2 shows the process steps that are performed on the electronic device 1 for establishing a telephone connection to the second electronic device 2, wherein again, equal reference numbers and/or component designations are used for equal parts as in FIG. 1 above. In order to avoid unnecessary repetitions, it is pointed to/reference is made to the detailed description in FIG. 1.

The process steps of FIG. 2 are prior art.

In a first process step A, the electronic device 1 can be set into an unlocked state and on the touch-sensitive display 5 a main user interface 6 can be displayed. The main user interface 6 can display a plurality of icons. One of the icons can be a telephone call icon 7.

By touching the telephone call icon 7 with his finger 8, the user can command the electronic device 1 to enter a telephone menu 9 associated with the telephone call icon 7. In other words, the electronic device 1 can detect a selection of a telephone call icon 7 that is displayed on the touch-sensitive display 5. In reaction to this selection, the telephone menu 9 is displayed as described in the following process step B.

In the process step B, the telephone menu 9 is displayed on the touch-sensitive display 5 of the electronic device 1.

The telephone menu 9 can comprise a call options menu 10. The call options menu 10 can contain different call options such as Favorites 11, Recents 12, Contacts 13, Keypad 14 and Voicemail 15, wherein each of the call options can have its own icon.

The call option 11, 12, 13, 14, 15 of the call options menu 10 that is currently active can be highlighted. The appearance of the telephone menu 9 can be adapted to the call option 11, 12, 13, 14, 15 that is currently active.

By default, it can be set, that when a selection of the telephone call icon 7 is detected in the main user interface 6, the call options menu 10 highlights and displays that call option 11, 12, 13, 14, 15 of the call options menu 10 that was previously highlighted and displayed before the telephone menu 9 was closed in a previous session.

In one configuration, that is displayed in step B of FIG. 2, the telephone menu 9 can display a call history of recent telephone connections to different contacts or telephone numbers 16, wherein the different contacts or telephone numbers 16 are arranged in the form of a list. The list can have multiple lines, wherein each of the lines represents a contact or telephone number 16.

By touching one of the contacts or telephone numbers 16 with his finger 8, the user can command the electronic device 1 to initiate a telephone call to the second electronic device 2 associated with the selected contact or telephone number 16 that is touched. In other words, the electronic device 1 can detect a selection of one of the contacts or telephone numbers 16 that is displayed on the touch-sensitive display 5 and initiate a telephone call to the second electronic device 2 associated with the selected contact or telephone number 16 that is selected.

While the connection is being established, an establishing call options menu can be displayed on the touch-sensitive display 5. For the sake of simplicity, this menu and process step is not separately displayed in the drawings.

In case the user of the second electronic device 2 accepts the phone call, a telephone connection to the second electronic device 2 can be provided.

While the telephone connection to the second electronic device 2 is provided, a telephone connection menu 17 can be displayed on the touch-sensitive display 5, as shown in step C.

The telephone connection menu 17 can comprise an end call icon 18 for terminating the telephone connection.

As displayed in step D, when the telephone connection is terminated by the second electronic device 2, the touch-sensitive display 5 immediately displays and makes available for selection an updated telephone menu 9. This updated telephone menu 9 can display a call history of recent telephone connections to different contacts or telephone numbers 16, including the recent telephone connection, wherein the different contacts or telephone numbers 16 are arranged in the form of a list. The list can have multiple lines, wherein each of the lines represents a contact or telephone number 16.

In case the user of the electronic device 1 also had the intention of terminating the telephone connection during process step C, the immediate switch to step D could be performed while the user is moving his finger to the position of the touch-sensitive display 5, where the end call icon 18 was displayed in process step C. In this case, the user might not recognize the change of appearance of the content displayed on the touch-sensitive display 5 to step D and thus could unintentionally touch the touch-sensitive display 5 with his finger 8 on the position where the end call icon 18 was displayed in process step C. As in a time, when the user touches the touch-sensitive display 5 with his finger 8, the touch-sensitive display 5 already displays the telephone menu 9 of step D, the user could unintentionally select a contact or telephone number 16 that is in the position where the end call icon 18 was displayed in process step C and immediately initiate a telephone call to the second electronic device 2 associated with the selected contact or telephone number 16. In the example of FIG. 2 D this could be Contact 5. In other words, the electronic device 1 can detect a selection of one of the contacts or telephone numbers 16 that is displayed on the touch-sensitive display 5 and initiate a telephone call to the second electronic device 2 associated with the selected contact or telephone number 16 that is selected. While the connection is being established, an establishing call options menu can be displayed on the touch-sensitive display 5.

This behavior of the prior art example leads to excess use of battery resources in the electronic device, because establishing a telephone connection is very energy intense. The behavior also leads to network overload, because if a lot of people have such electronic devices that have a malfunction to build up unwanted telephone connections, a communication network, such as a GSM-Network, has to handle a lot of unnecessary traffic. This behavior also leads to negative environmental impacts and also negative health impacts on the user of the electronic device, because in the phase when building up a telephone connection, the radiation exposure is the highest. It is a long felt need to overcome the shortcomings of the prior art.

Improved embodiments of the electronic device 1 and improved embodiments of methods carried out by the computer 4 in the electronic device 1 are described in connection with the following figures.

Figure 3:
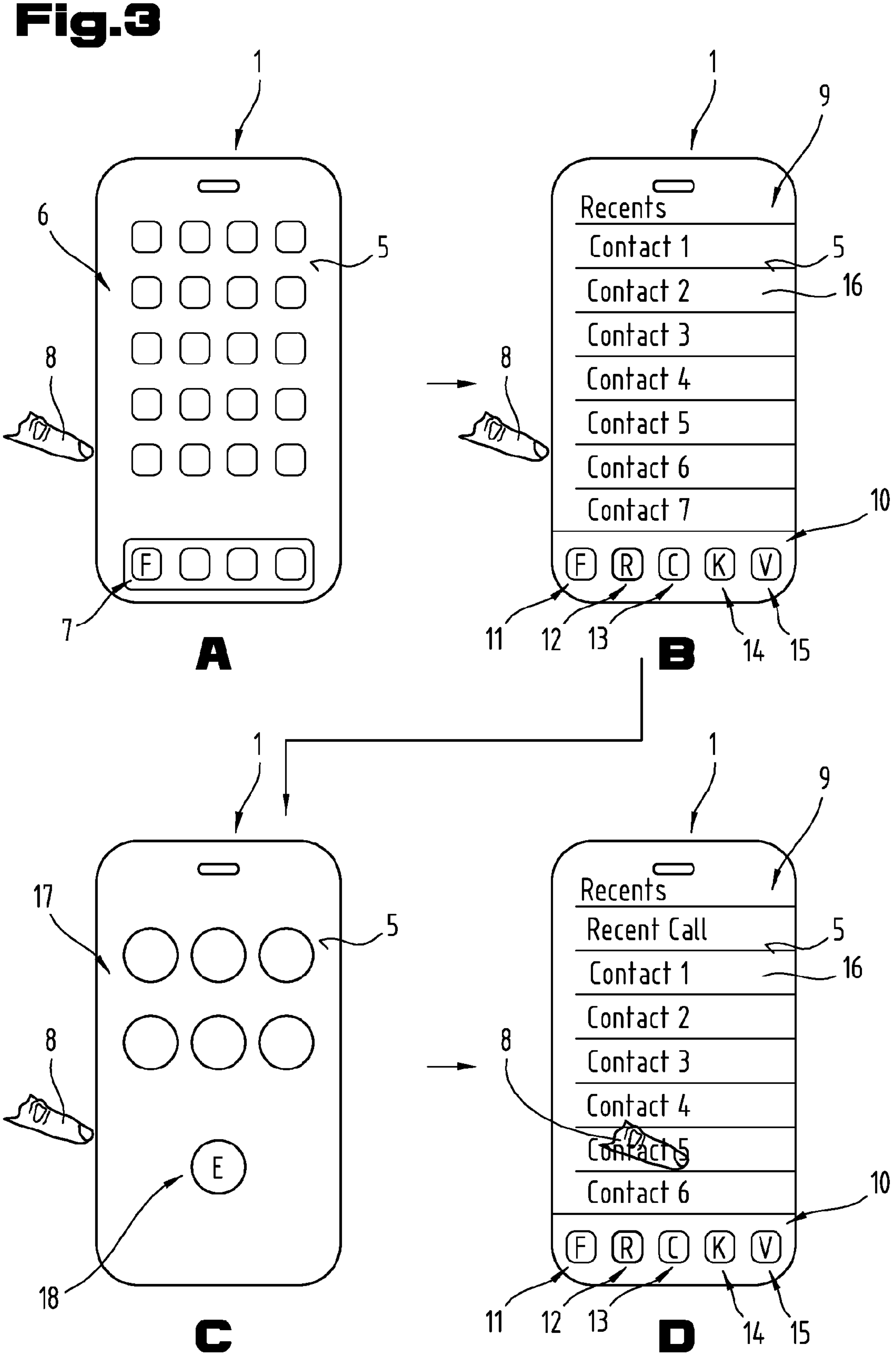
FIG. 3 shows a first embodiment of steps that are performed when providing a telephone connection to the second electronic device.

FIG. 3 shows a first embodiment of method steps carried out by the computer 4 in the electronic device 1.

In a first process step A, the electronic device 1 can be set into an unlocked state and on the touch-sensitive display 5 a main user interface 6 can be displayed. The main user interface 6 can display a plurality of icons. One of the icons can be a telephone call icon 7.

By touching the telephone call icon 7 with his finger 8, the user can command the electronic device 1 to enter a telephone menu 9 associated with the telephone call icon 7. In other words, the electronic device 1 can detect a selection of a telephone call icon 7 that is displayed on the touch-sensitive display 5. In reaction to this selection, the telephone menu 9 is displayed as described in the following process step B.

In the process step B, the telephone menu 9 is displayed on the touch-sensitive display 5 of the electronic device 1.

The telephone menu 9 can comprise a call options menu 10. The call options menu 10 can contain different call options such as Favorites 11, Recents 12, Contacts 13, Keypad 14 and Voicemail 15, wherein each of the call options can have its own icon.

The call option 11, 12, 13, 14, 15 of the call options menu 10 that is currently active can be highlighted. The appearance of the telephone menu 9 can be adapted to the call option 11, 12, 13, 14, 15 that is currently active.

By default, it can be set, that when a selection of the telephone call icon 7 is detected in the main user interface 6, the call options menu 10 highlights and displays that call option 11, 12, 13, 14, 15 of the call options menu 10 that was previously highlighted and displayed before the telephone menu 9 was closed in a previous session.

In one configuration, that is displayed in step B of FIG. 3, the telephone menu 9 can display a call history of recent telephone connections to different contacts or telephone numbers 16, wherein the different contacts or telephone numbers 16 are arranged in the form of a list. The list can have multiple lines, wherein each of the lines represents a contact or telephone number 16.

By touching one of the contacts or telephone numbers 16 with his finger 8, the user can command the electronic device 1 to initiate a telephone call to the second electronic device 2 associated with the selected contact or telephone number 16 that is touched. In other words, the electronic device 1 can detect a selection of one of the contacts or telephone numbers 16 that is displayed on the touch-sensitive display 5 and initiate a telephone call to the second electronic device 2 associated with the selected contact or telephone number 16 that is selected.

While the connection is being established, an establishing call options menu can be displayed on the touch-sensitive display 5. For the sake of simplicity, this menu and process step is not separately displayed in the drawings.

In case the user of the second electronic device 2 accepts the phone call, a telephone connection to the second electronic device 2 can be provided.

While the telephone connection to the second electronic device 2 is provided, a telephone connection menu 17 can be displayed on the touch-sensitive display 5, as shown in step C.

The telephone connection menu 17 can comprise an end call icon 18 for terminating the telephone connection.

As displayed in step D, when the telephone connection is terminated by the second electronic device 2, the touch-sensitive display 5 could immediately display an updated telephone menu 9. In this embodiment, a selection of a contact or telephone number 16 of the updated telephone menu 9 that is displayed on the touch-sensitive display 5 could be made unavailable during the determined time range.

A selection of a contact or telephone number 16 of an updated telephone menu 9 that is displayed on the touch-sensitive display 5, could be made available after the determined time range has passed. By touching one of the contacts or telephone numbers 16 with his finger 8, the user can command the electronic device 1 to initiate a telephone call to the second electronic device 2 associated with the selected contact or telephone number 16 that is touched. In other words, the electronic device 1 can detect a selection of one of the contacts or telephone numbers 16 that is displayed on the touch-sensitive display 5 and initiate a telephone call to the second electronic device 2 associated with the selected contact or telephone number 16 that is selected.

Another embodiment is described by use of FIG. 3, wherein again, equal reference numbers and/or component designations are used for equal parts as in FIG. 3 above. In order to avoid unnecessary repetitions, it is pointed to/reference is made to the detailed description in FIG. 3. The steps A to C can be performed as described in FIG. 3.

As displayed in step D, when the telephone connection is terminated by the second electronic device 2, the touch-sensitive display 5 could display an updated telephone menu 9, but in this embodiment the updated telephone menu 9 could be in in grayed out display to make the user aware that a selection of a contact or telephone number 16 of the updated telephone menu 9 that is displayed in grayed out representation on the touch-sensitive display 5 is not available during the determined time range.

After the determined time range has passed, the updated telephone menu 9 can switch to normal appearance and a selection of a contact or telephone number 16 of an updated telephone menu 9 that is displayed on the touch-sensitive display 5, could be made available. By touching one of the contacts or telephone numbers 16 with his finger 8, the user can command the electronic device 1 to initiate a telephone call to the second electronic device 2 associated with the selected contact or telephone number 16 that is touched. In other words, the electronic device 1 can detect a selection of one of the contacts or telephone numbers 16 that is displayed on the touch-sensitive display 5 and initiate a telephone call to the second electronic device 2 associated with the selected contact or telephone number 16 that is selected.

Another embodiment is described by use of FIG. 3, wherein again, equal reference numbers and/or component designations are used for equal parts as in FIG. 3 above. In order to avoid unnecessary repetitions, it is pointed to/reference is made to the detailed description in FIG. 3. The steps A to C can be performed as described in FIG. 3.

In this embodiment, when the telephone connection is terminated by the second electronic device 2, the touch-sensitive display 5 could still display the telephone connection menu 17, as shown in step C for the determined time range. After the determined time range has passed, the touch-sensitive display 5 could display an updated telephone menu 9, as displayed in step D.

A selection of a contact or telephone number 16 of an updated telephone menu 9 that is displayed on the touch-sensitive display 5, could be made available immediately when the updated telephone menu 9 is displayed. By touching one of the contacts or telephone numbers 16 with his finger 8, the user can command the electronic device 1 to initiate a telephone call to the second electronic device 2 associated with the selected contact or telephone number 16 that is touched. In other words, the electronic device 1 can detect a selection of one of the contacts or telephone numbers 16 that is displayed on the touch-sensitive display 5 and initiate a telephone call to the second electronic device 2 associated with the selected contact or telephone number 16 that is selected.

Figure 4:
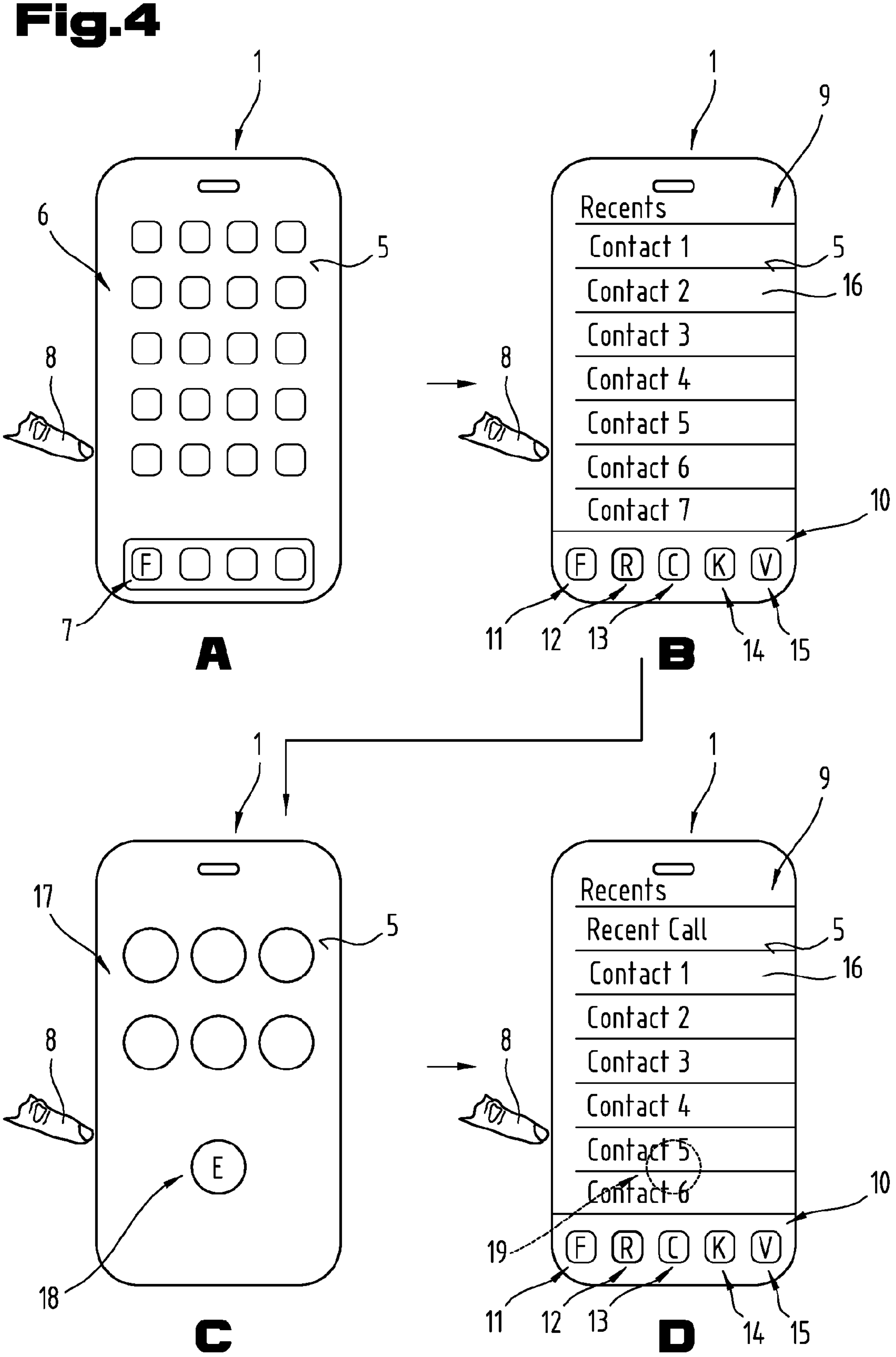
FIG. 4 shows a second embodiment of steps that are performed when providing a telephone connection to the second electronic device.

FIG. 4 shows a further and possibly independent embodiment of the method, wherein again, equal reference numbers and/or component designations are used for equal parts as in FIG. 3 above. In order to avoid unnecessary repetitions, it is pointed to/reference is made to the detailed description in FIG. 3. The steps A to C can be performed as described in FIG. 3.

As displayed in step D, when the telephone connection is terminated by the second electronic device 2, the touch-sensitive display 5 could immediately display an updated telephone menu 9. In this embodiment, only in a display area 19 where the end call icon 18 was displayed in previous step C, a selection of a contact or telephone number 16 of the updated telephone menu 9 that is displayed on the touch-sensitive display 5 could be made impossible during the determined time range. Outside the display area 19, a selection of a contact or telephone number 16 of the updated telephone menu 9 that is displayed on the touch-sensitive display 5, could be possible immediately when the updated telephone menu 9 is displayed.

In a first variation of this embodiment, the display area 19 where the end call icon 18 was displayed in previous step C could have a different appearance in comparison to the rest of the updated telephone menu 9 displayed on the touch-sensitive display 5. For example, the display area 19 where the end call icon 18 was displayed in previous step C could be grayed out. The display area 19 where the end call icon 18 was displayed in previous step C could also be marked by a frame or a doted frame or the like.

In a second variation of this embodiment, the display area 19 where the end call icon 18 was displayed in previous step C could have no different appearance in comparison to the rest of the updated telephone menu 9 displayed on the touch-sensitive display 5.

A selection of a contact or telephone number 16 of an updated telephone menu 9 that is displayed on the touch-sensitive display 5, could be made available without restriction after the determined time range has passed.

By touching one of the contacts or telephone numbers 16 with his finger 8, the user can command the electronic device 1 to initiate a telephone call to the second electronic device 2 associated with the selected contact or telephone number 16 that is touched. In other words, the electronic device 1 can detect a selection of one of the contacts or telephone numbers 16 that is displayed on the touch-sensitive display 5 and initiate a telephone call to the second electronic device 2 associated with the selected contact or telephone number 16 that is selected.

Figure 5:
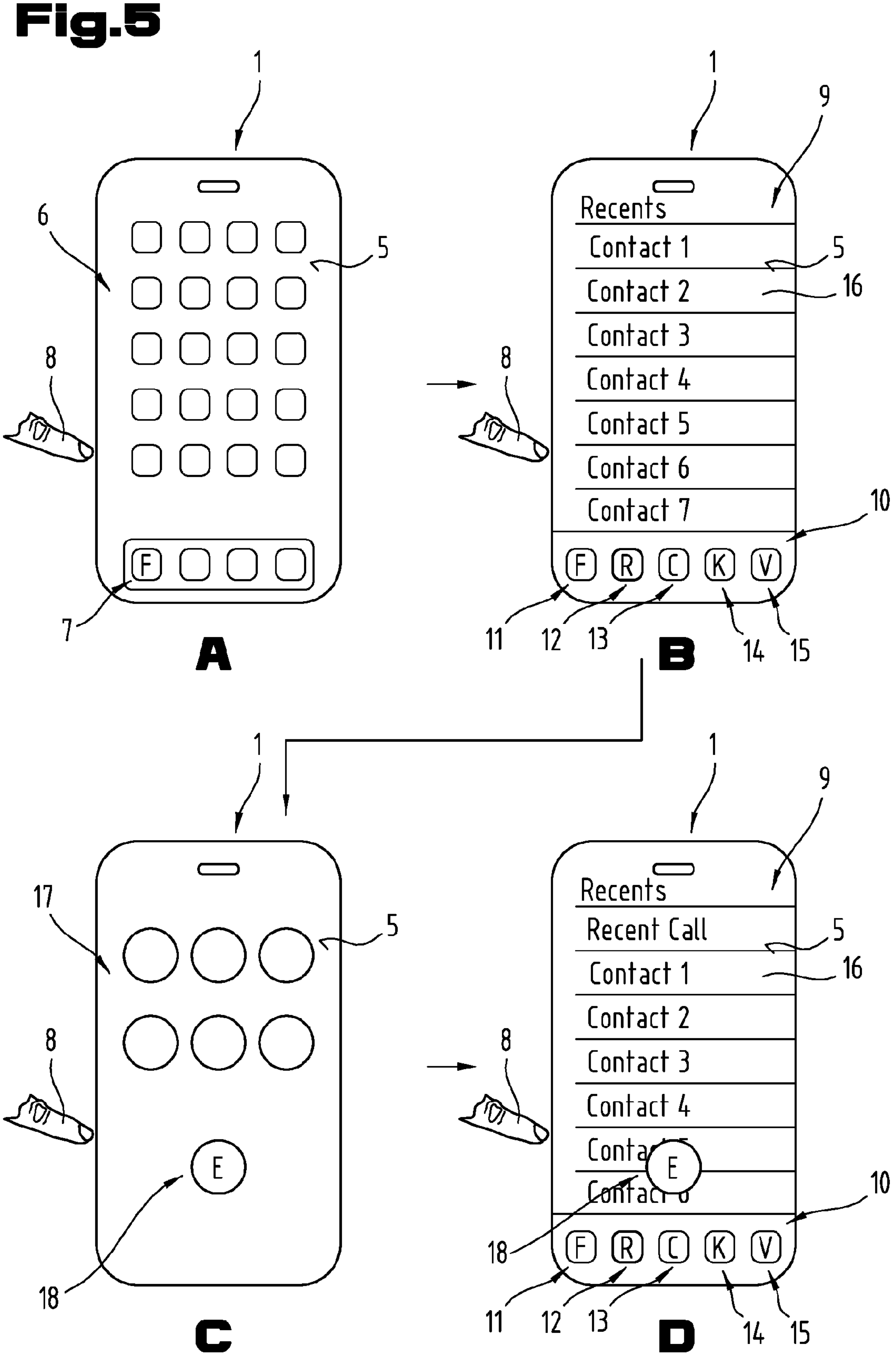
FIG. 5 shows a third embodiment of steps that are performed when providing a telephone connection to the second electronic device.

FIG. 5 shows a further and possibly independent embodiment of the method, wherein again, equal reference numbers and/or component designations are used for equal parts as in FIG. 3 above. In order to avoid unnecessary repetitions, it is pointed to/reference is made to the detailed description in FIG. 3. The steps A to C can be performed as described in FIG. 3.

As displayed in step D, when the telephone connection is terminated by the second electronic device 2, the touch-sensitive display 5 could immediately display an updated telephone menu 9. In this embodiment, the end call icon 18 could still be displayed in the updated telephone menu 9 during the determined time range. Outside the end call icon 18, a selection of a contact or telephone number 16 of the updated telephone menu 9 that is displayed on the touch-sensitive display 5, could be possible immediately when the updated telephone menu 9 is displayed.

A selection of a contact or telephone number 16 of an updated telephone menu 9 that is displayed on the touch-sensitive display 5, could be made possible without restriction after the determined time range has passed.

By touching one of the contacts or telephone numbers 16 with his finger 8, the user can command the electronic device 1 to initiate a telephone call to the second electronic device 2 associated with the selected contact or telephone number 16 that is touched. In other words, the electronic device 1 can detect a selection of one of the contacts or telephone numbers 16 that is displayed on the touch-sensitive display 5 and initiate a telephone call to the second electronic device 2 associated with the selected contact or telephone number 16 that is selected.

Figure 6:
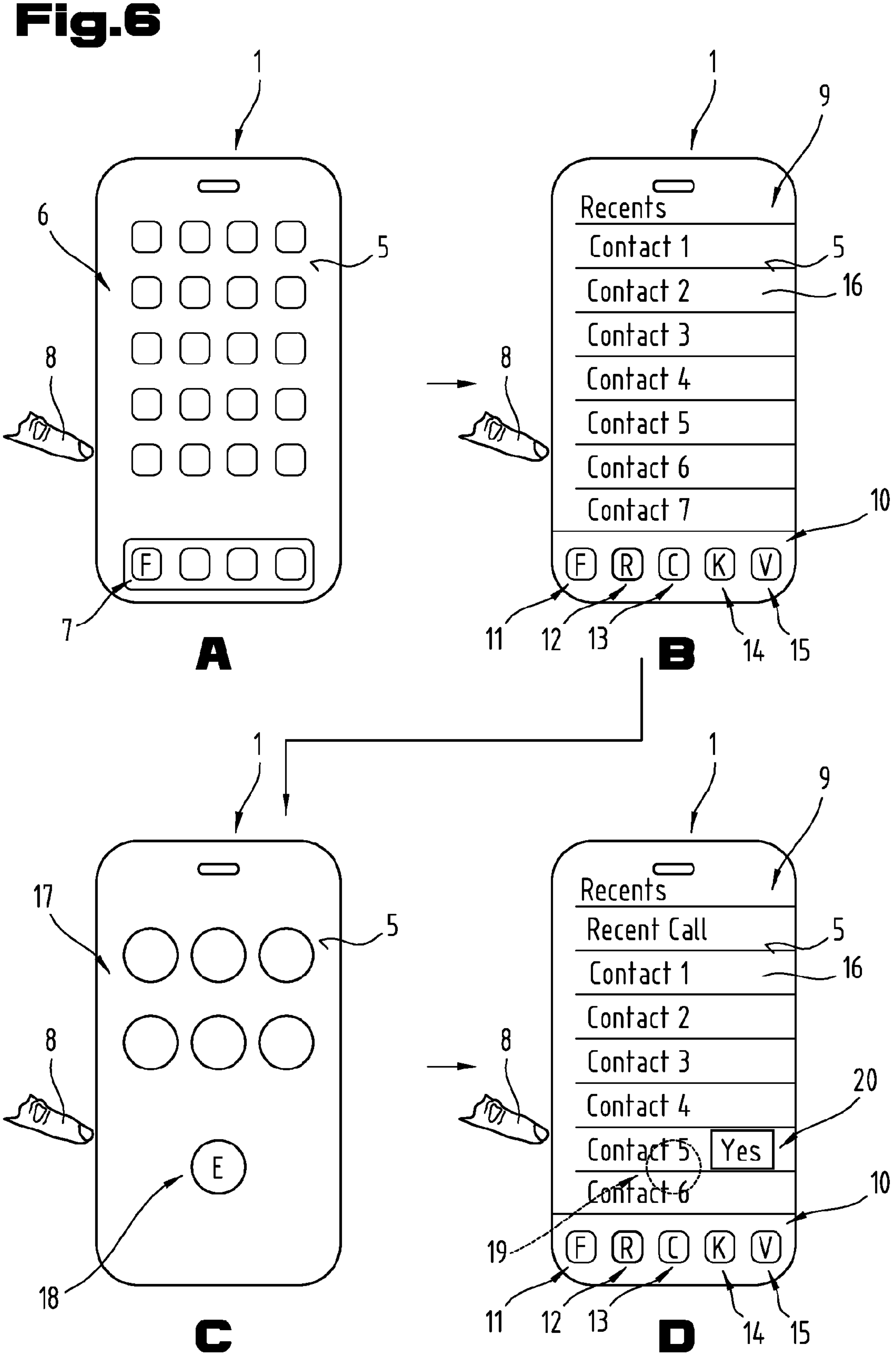
FIG. 6 shows a fourth embodiment of steps that are performed when providing a telephone connection to the second electronic device.

FIG. 6 shows a further and possibly independent embodiment of the method, wherein again, equal reference numbers and/or component designations are used for equal parts as in FIG. 3 above. In order to avoid unnecessary repetitions, it is pointed to/reference is made to the detailed description in FIG. 3. The steps A to C can be performed as described in FIG. 3.

As displayed in step D, when the telephone connection is terminated by the second electronic device 2, the touch-sensitive display 5 could immediately display an updated telephone menu 9. In this embodiment, a selection of a contact or telephone number 16 of the updated telephone menu 9 that is displayed on the touch-sensitive display 5 within a display area 19 where the end call icon 18 was displayed in previous step C, which is performed during the determined time range, leads to a popup of a confirmation request 20. Only after confirming the confirmation request 20 by setting an action, for example touching a predetermined area of the touch-sensitive display 5, the electronic device 1 can initiate a telephone call to the second electronic device 2 associated with the selected contact or telephone number 16.

In this case the display area 19 where the end call icon 18 was displayed in previous step C could be marked by a frame or a doted frame or the like. It is also possible that the display area 19 where the end call icon 18 was displayed in previous step C has no different appearance in comparison to the rest of the updated telephone menu 9 displayed on the touch-sensitive display 5.

Outside the display area 19 where the end call icon 18 was displayed in previous step C, a selection of a contact or telephone number 16 of the updated telephone menu 9 that is displayed on the touch-sensitive display 5, could be available immediately when the updated telephone menu 9 is displayed.

A selection of a contact or telephone number 16 of an updated telephone menu 9 that is displayed on the touch-sensitive display 5, could be made available without restriction after the determined time range has passed.

By touching one of the contacts or telephone numbers 16 with his finger 8, the user can command the electronic device 1 to initiate a telephone call to the second electronic device 2 associated with the selected contact or telephone number 16 that is touched. In other words, the electronic device 1 can detect a selection of one of the contacts or telephone numbers 16 that is displayed on the touch-sensitive display 5 and initiate a telephone call to the second electronic device 2 associated with the selected contact or telephone number 16 that is selected.

Figure 7:
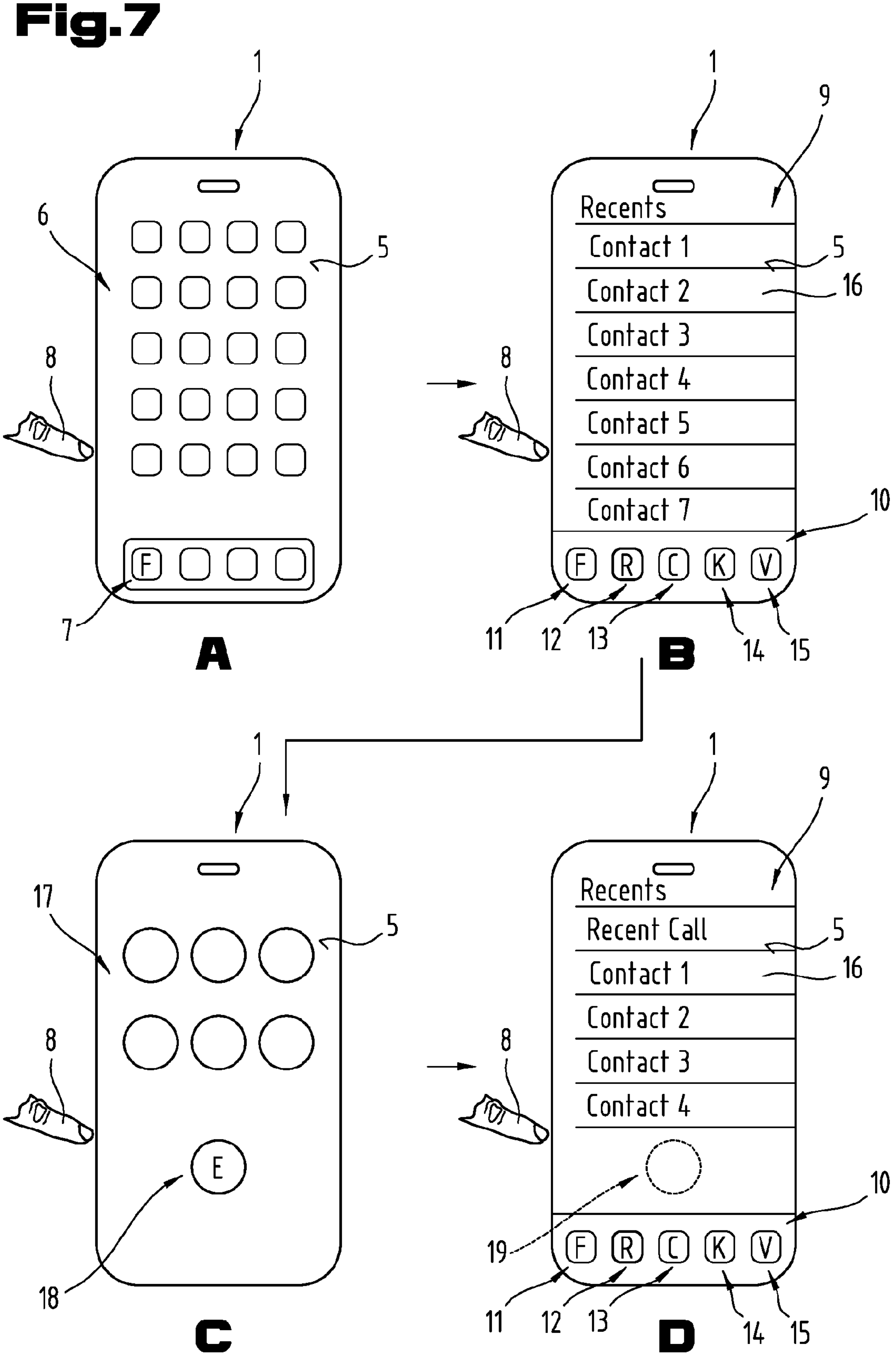
FIG. 7 shows a fifth embodiment of steps that are performed when providing a telephone connection to the second electronic device.

FIG. 7 shows a further and possibly independent embodiment of the method, wherein again, equal reference numbers and/or component designations are used for equal parts as in FIG. 3 above. In order to avoid unnecessary repetitions, it is pointed to/reference is made to the detailed description in FIG. 3. The steps A to C can be performed as described in FIG. 3.

As displayed in step D, when the telephone connection is terminated by the second electronic device 2, the touch-sensitive display 5 could immediately display an updated telephone menu 9. In this embodiment, the updated telephone menu 9 does not display any contacts or telephone numbers 16 within a display area 19 where the end call icon 18 was displayed in previous step C.

Outside the display area 19, a selection of a contact or telephone number 16 of the updated telephone menu 9 that is displayed on the touch-sensitive display 5, could be available immediately when the updated telephone menu 9 is displayed.

The updated telephone menu 9 with all contacts or telephone numbers 16 can be displayed after the determined time range has lapsed.

In another embodiment it is also possible that the updated telephone menu 9 with all contacts or telephone numbers 16 is displayed after a scroll movement is performed.

By touching one of the contacts or telephone numbers 16 with his finger 8, the user can command the electronic device 1 to initiate a telephone call to the second electronic device 2 associated with the selected contact or telephone number 16 that is touched. In other words, the electronic device 1 can detect a selection of one of the contacts or telephone numbers 16 that is displayed on the touch-sensitive display 5 and initiate a telephone call to the second electronic device 2 associated with the selected contact or telephone number 16 that is selected.

Figure 8:
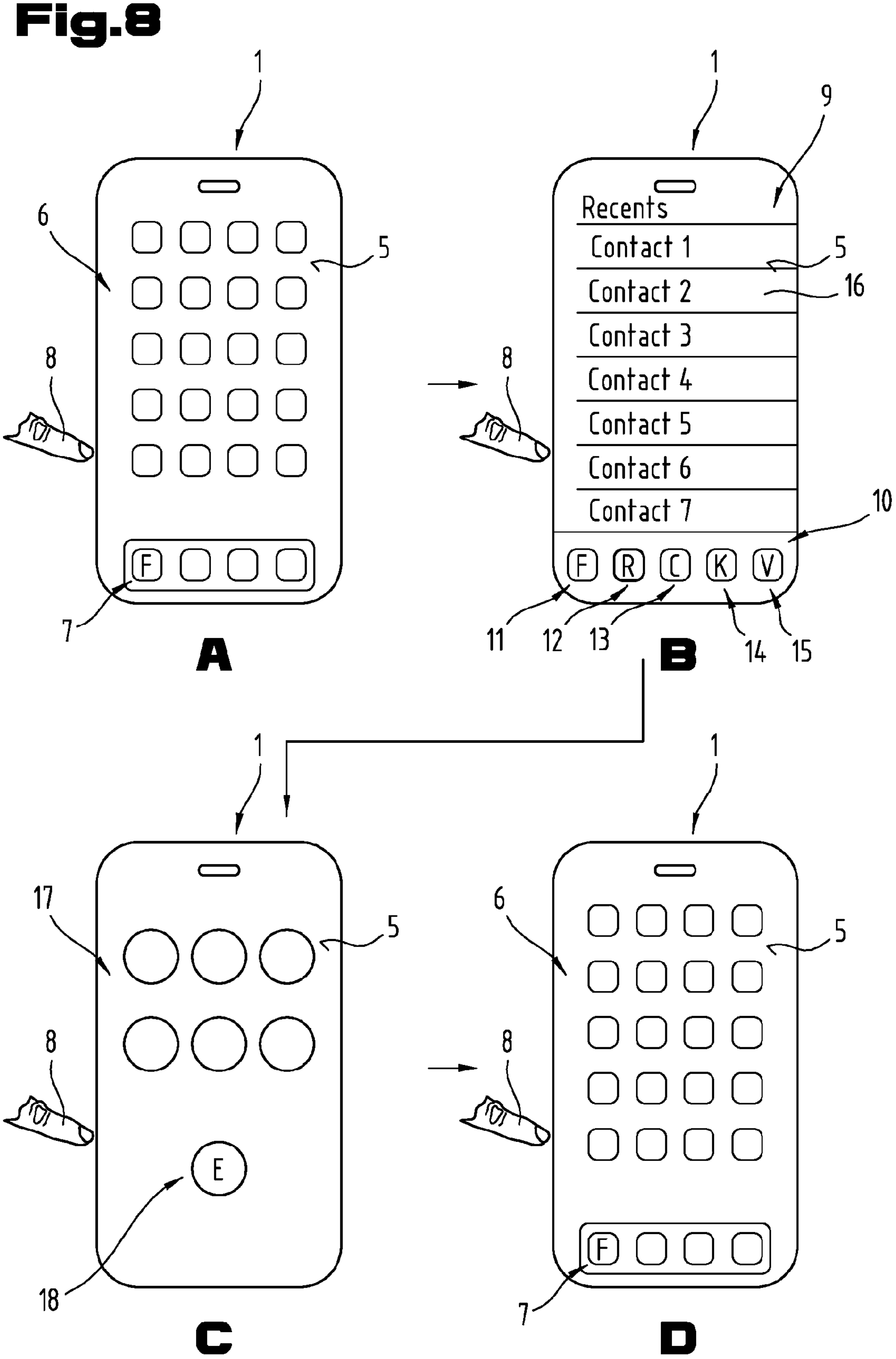
FIG. 8 shows a sixth embodiment of steps that are performed when providing a telephone connection to the second electronic device.

FIG. 8 shows a further and possibly independent embodiment of the method, wherein again, equal reference numbers and/or component designations are used for equal parts as in FIG. 3 above. In order to avoid unnecessary repetitions, it is pointed to/reference is made to the detailed description in FIG. 3. The steps A to C can be performed as described in FIG. 3.

As displayed in step D, when the telephone connection is terminated by the second electronic device 2, the touch-sensitive display 5 could immediately display a main user interface 6.

Starting from the main user interface 6, the user can set new actions.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the technical teaching provided by the present invention lies within the ability of the person skilled in the art in this technical field.

The scope of protection is determined by the claims. Nevertheless, the description and drawings are to be used for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

Although only a few embodiments of the present invention have been shown and described, it is to be understood that many changes and modifications may be made thereunto without departing from the spirit and scope of the invention.

LIST OF REFERENCE NUMBERS

1 electronic device
2 second electronic device
3 communication network
4 computer
5 touch-sensitive display
6 user interface
7 telephone call icon
8 finger
9 telephone menu
10 call options menu
11 Favorites
12 Recents
13 Contacts
14 Keypad
15 Voicemail
16 contact or telephone number
17 telephone connection menu
18 end call icon
19 display area
20 confirmation request

What is claimed is:

1. A method carried out by a computer in an electronic device with a touch-sensitive display, wherein the electronic device is configured for providing a telephone connection to a second electronic device, the method comprising the steps:

detecting a selection of a telephone call icon that is displayed on the touch- sensitive display;

displaying a telephone menu associated with the selection of the telephone call icon on the touch-sensitive display, wherein the telephone menu associated with the telephone call icon displays a call history of recent telephone connections to different contacts or telephone numbers, wherein the different contacts or telephone numbers are arranged as a list;

detecting a selection of a contact or telephone number that is displayed on the touch-sensitive display:

initiating a telephone call to the second electronic device associated with the selected contact or telephone number for the purpose of providing a telephone connection to the second electronic device;

providing a telephone connection to the second electronic device;

displaying an end call icon on the touch-sensitive display while providing the telephone connection to the second electronic device, wherein in case the telephone connection is terminated by the second electronic device:

within a determined time range after termination of the telephone connection by the second electronic device, the end call icon is still displayed for the determined time range such that a detection of the touch-sensitive display being touched in a display area in which the end call icon was displayed during the telephone connection, does not initiate a new telephone call.

2. The method according to claim 1, wherein only a detection of the touch-sensitive display being touched in the display area in which the end call icon was displayed during the telephone connection, does not initiate a new telephone connection, wherein a detection of the touch-sensitive display being touched outside the display area in which the end call icon was displayed during the telephone connection, does select the operation associated with the icon that is displayed on the area where the touch-sensitive display is touched.

3. The method according to claim 1, wherein the determined time range after termination of the telephone connection is set to a value of 0 seconds to 5 seconds.

4. The method according to claim 1, wherein after termination of the telephone connection by the second electronic device, the touch-sensitive display displays the telephone menu that was displayed before providing the telephone connection to the second electronic device, wherein at least in the display area where the end call icon was displayed, a selection of a contact or telephone number of the updated telephone menu that is displayed on the touch-sensitive display could be made impossible during the determined time range.

5. The method according to claim 1, wherein after termination of the telephone connection by the second electronic device, the touch-sensitive display displays the telephone menu that was displayed before providing the telephone connection to the second electronic device, wherein further selection of an operation is not possible during the determined time range after termination of the telephone connection.

6. The method according to claim 5, wherein if the displayed telephone menu is a call history of recent telephone connections to different contacts or telephone numbers including the telephone connection that was just terminated and it is detected that the touch-sensitive display is touched in a display area in which the end call icon was displayed during the last telephone connection, then instead of directly initiating a new telephone connection to one of the contacts or telephone numbers displayed in the call history, a confirmation request appears that requests further confirmation to initiate a new telephone connection.

7. The method according to claim 1, wherein after termination of the telephone connection by the second electronic device, a telephone menu is displayed that does not allow direct initiation of a further telephone connection.

8. The method according to claim 1, wherein the determined time range after termination of the telephone connection, is not caused by a delay due to lack of computing power, but is foreseen intentionally.

9. The method according to claim 1, wherein the determined time range after termination of the telephone connection is set to a value of 0 seconds to 2 seconds.

10. The method according to claim 1, wherein the determined time range after termination of the telephone connection is set to a value of 0 seconds to 0.7 seconds.

11. An electronic device comprising a computer, wherein the computer is configured to perform the steps of the method of claim 1.

12. A non-transitory computer-readable storage medium that stores a computer program comprising a set of computer readable instructions which, when executed by a computer in an electronic device, cause the computer to carry out the steps of the method of claim 1.

13. A method carried out by a computer in an electronic device with a touch-sensitive display, wherein the electronic device is configured for providing a telephone connection to a second electronic device, the method comprising the steps:

providing a telephone connection to the second electronic device;

displaying an end call icon on the touch-sensitive display while providing the telephone connection to the second electronic device, wherein in case the telephone connection is terminated by the second electronic device: within a determined time range after termination of the telephone connection by the second electronic device, the end call icon is still displayed for the determined time range such that a detection of the touch-sensitive display being touched in a display area in which the end call icon was displayed during the telephone connection, does not initiate a new telephone call, wherein the determined time range after termination of the telephone connection is set to a value of 0 seconds to 5 seconds.

14. A method carried out by a computer in an electronic device with a touch-sensitive display, wherein the electronic device is configured for providing a telephone connection to a second electronic device, the method comprising the steps:

providing a telephone connection to the second electronic device;

displaying an end call icon on the touch-sensitive display while providing the telephone connection to the second electronic device, wherein in case the telephone connection is terminated by the second electronic device:

within a determined time range after termination of the telephone connection by the second electronic device, the end call icon is still displayed for the determined time range such that a detection of the touch-sensitive display being touched in a display area in which the end call icon was displayed during the telephone connection, does not initiate a new telephone call, wherein after termination of the telephone connection by the second electronic device, a telephone menu is displayed that does not allow direct initiation of a further telephone connection.

* * * * *